United States Patent [19]

Hegedus

[11] Patent Number: 5,017,522

[45] Date of Patent: May 21, 1991

[54] CERAMIC BODIES OF CONTROLLED POROSITY AND PROCESS FOR MAKING SAME

[75] Inventor: Andreas G. Hegedus, San Francisco, Calif.

[73] Assignee: Hexcel Corporation, Dublin, Calif.

[21] Appl. No.: 377,085

[22] Filed: Jul. 7, 1989

[51] Int. Cl.$^5$ ............................................. C04B 38/06
[52] U.S. Cl. ........................................ 501/81; 501/87; 501/90; 501/95; 264/42; 264/59; 264/DIG. 19
[58] Field of Search ..................... 501/81, 87, 90, 95; 264/42, 59, DIG. 19

[56] References Cited

U.S. PATENT DOCUMENTS

| | | | |
|---|---|---|---|
| 2,875,501 | 3/1959 | Gravley | 264/59 |
| 2,919,483 | 1/1960 | Gravley | 264/59 |
| 3,112,184 | 11/1963 | Hollenback | 264/63 |
| 4,794,046 | 12/1988 | Nagai | 501/1 |

FOREIGN PATENT DOCUMENTS 0036362  2/1985  Japan ..................................... 501/81

*Primary Examiner*—Mark L. Bell
*Assistant Examiner*—Deborah Jones
*Attorney, Agent, or Firm*—Oblon, Spivak, McClelland, Maier & Neustadt

[57] ABSTRACT

A ceramic body of controlled porosity is formed by coating unidirectional fiber carriers with a hardenable liquid resin bearing powdered ceramic material, which resin is subsequently cured, hardened, or cooled to provide a green body which may be assembled with similar layers, in a desired shape, and subsequently sintered, to form a ceramic body having continuous pores corresponding to the position of the fibers.

12 Claims, No Drawings

CERAMIC BODIES OF CONTROLLED POROSITY AND PROCESS FOR MAKING SAME

BACKGROUND OF THE INVENTION

1. Field of the Invention

This invention pertains to the manufacture of sintered, ceramic bodies having oriented, controlled porosity. Particularly, multi-layered ceramic bodies, having oriented porosity, on a micron scale, are provided.

2. Background of the Prior Art

Porous, sintered ceramic bodies are used in a variety of applications. Significant applications include insulating bodies, heat exchange devices, filters for high temperature applications, etc. The dominant commercial method for the manufacture of such materials is the extrusion of a ceramic greenstock, through a die with small blockages, which correspond to holes formed in the greenstock. The greenstock is subsequently fired to sinter the ceramic material. Using this process, it is difficult to control the exact orientation, diameter and ultimate form of the pores in the ceramic. Additionally, the extruded greenstock is susceptible to extensive deformation or molding, and must be directly sintered into a ceramic body. Finally, extremely small, micron size pores are not achievable using this process.

Alternative processes are known in the art. Thus, U.S. Pat. No. 2,875,501 discloses the use of heat destructible fiber cores, which, upon sintering, define the oriented porosity in the ceramic body. In this patent, yarns preferably of nylon are drawn through a liquid coagulating agent, which may include a PVA suspension, and then subsequently passed through a dispersion of ceramic precursor, which may be barium titanate. The PVA coated on the nylon yarn adheres the titanate particles to the fiber. A plurality of yarns similarly passed through the ceramic precursor are assembled, and the mass is subsequently fired, to sinter the ceramic. In the process, the fiber, and the PVA are destroyed. The result is a ceramic body having longitudinally oriented continuous holes, or passages, which makes an ideal insulator for conductive material placed in the passages. U.S. Pat. Nos. 2,919,483 and 3,112,184 disclose similar processes, the '184 patent using a carrier sheet, which may be deformed. A common problem to the processes of these patents is the fact that the material, prior to sintering, has no inherent strength, and cannot be molded, handled, or otherwise easily assembled. While the carrier sheet of U.S. Pat. No. 3,112,184 provides for some flexibility, and provides an opportunity to make multi-layered articles, the film itself is the fugitive carrier, and does not permit the formation of small pores, particularly pores in the micron range.

A similar process is addressed by Japanese Patent Publication 297762/48 which teaches the use of a carbon fiber provided with a small amount of binder, such as PVA, dredged in a ceramic raw material powder, which is subsequently fired to form a porous ceramic plate. Alternative processes include premolding a ceramic powder, provided with cavities, and filling the cavities with a graphite powder product, the premolded material being subsequently compressed and sintered, whereupon the graphite is destroyed, resulting in cavities in the ceramic.

Taken as a whole, the art fails to teach a process whereby a ceramic body may be produced, with continuous, small dimension pores, which can be molded into a variety of shapes, or combined with a plurality of layers, in any desired orientation. This is particularly due to the fact that those methods that employ carriers for the ceramic powder, which are subsequently destroyed upon sintering, merely adhere the ceramic powder to the carrier via the use of a coagulating agent, such as PVA, which does not give the resulting, unfired precursor any integrity or body strength.

SUMMARY OF THE INVENTION

The above-identified drawbacks of the prior art, and other objectives, are met by towing a plurality of fibers of small, micron dimension, through a curable liquid resin composition, the coated fiber being provided with ceramic precursor powder, such as $Al_2O_3$. The alumina powder is preferably provided in the liquid resin itself, converting the liquid to a slurry. Alternatively, it may also be provided by drawing the coated fiber through a bed of the powder material. A plurality of fibers, such as a "unidirectional tape" so coated can be subjected to mild heating, below sintering temperature, to partially cure the resin. It is particularly preferred to cure the resin to a "B" stage, such that the resulting body can be easily deformed. A plurality of pieces can be laid up and/or molded to any desired form (a preform). Once prepared, the stacked preforms are sintered at conventional sintering temperatures, so as to produce a ceramic body. In the sintering process, the tape, prepared from fibrous materials, such as graphite or other carbon fibers are destroyed, together with the partially cured resin. The result is a ceramic body, which may be comprised of a plurality of layers, provided with small-dimensioned continuous pores, which need not be linear and may define a tortuous path, and may be differentially oriented, in various layers, to provide a ceramic body. The body may be employed, if provided with non-linear pores, as an ultra-high temperature microporous filter, if provided with differing orientations in a plurality of layers, as a heat-exchanging substrate for integrated circuit devices, and other high temperature applications.

DETAILED DESCRIPTION OF THE INVENTION

The ceramic bodies of controlled porosity are prepared by coating a fugitive carrier of small dimension, such as graphite fibers, with a curable resin and a ceramic precursor powder. The coating process may be preferably effected by pulling the fibers, preferably in the form of a unidirectional tape, through a slurry comprised of a resin bath with ceramic precursor powder distributed therein, or alternatively by first coating the fiber with the resin and subsequently dredging the coated fiber in the ceramic powder. The coating method is not critical, a preferred embodiment being simply towing or drawing a tape of graphite fibers through a slurry of liquid resin and ceramic powder.

The resin employed in the invention can be virtually any resin compatible with the ceramic powder, and not destructive or toxic when oxidized and destroyed during sintering. Due to their ease of processing, and relative low cost, thermoset resins such as epoxy resins, polyester resins, polyurethane resins, etc. may be used. If the application involves exposing the unsintered, preliminarily cured body to extremely high temperatures, it may be desirable to use a thermoplastic resin. Nothing in the processing prohibits its use. However, the higher temperatures, and more difficult processing, generally associated with such resins may make them, for general purposes, less suitable alternatives. The basic requirements of the resin are that it be coatable onto the carrier, in a liquid state, and be curable to a B stage, that is, a moldable or drapable state. One preferred embodiment involves the use of an acrylate resin.

If the application warrants the cost, the use of thermoplastic resins offers unique advantages. Specifically, layers of the greenstock can be stacked one upon the other to form a block, and the block then deformed at a temperature above the softening point of the thermoplastic, but below the sintering temperature of the ceramic. Thus, parts with various shapes, curves, or bends can be prepared. Though similar forms may be layed up using thermosetting systems, further deformation after curing would not be possible.

By this process, it is also possible to stack partially cured layers together and heat the layers under pressure at a temperature below the sintering temperature to form a block, which block can then be machined to a desired shape prior to sintering.

Similarly, the ceramic powder material employed as the precursor of the ceramic body can be virtually any suitable ceramic powder. One ubiquitous, and therefore particular preferred, powder material is $Al_2O_3$, although other suitable materials are known. A variety of suitable materials are recited in U.S. Pat. No. 3,112,184. This ceramic powder need only be compatible with the resin, in its liquid and preliminarily cured state.

In preferred embodiments, the fiber is coated with the curable resin and ceramic powder simultaneously, by towing a unidirectional tape of the fibers through a slurry comprised of the resin and powder. The ratio of resin to powder will vary depending on the particular components selected. In general, the limit on the content of ceramic powder will be the ability to cure the resin to a state which provides moldability or drapability, but retains integrity of the preform. The minimum ceramic powder concentration will of course be that which provides a ceramic body upon sintering. In general, on a volume basis, if a resin/powder slurry is employed, the powder will constitute from 15-50 percent, by volume, of the slurry.

Once the fiber is coated with the resin in which are embedded, or on which are adhered, ceramic powder particles, the resin is staged, by mild heating, to form a preform, or similar body. As is familiar to those skilled in the art, these materials may be stored, and transported, and shaped, molded, or combined in layers, to provide any desired shape. It should be noted that the carrier body, such as a graphite fiber, remains present in the body, and in fact, lends the body substantial strength. Thus, if a tortuous path is desired for the pores of the ceramic body, the preform may be laid up on a tooling mold, corresponding to the desired path, and the body subsequently sintered, leaving a continuous, but non-linear pore through the ceramic body. Additionally, as is common in the prepreg art, a plurality of partially cured layers may be stacked together, and the resulting multi-layer product subsequently sintered. Alternatively, a plurality of layers may be stacked, and cured by heat and pressure below the sintering temperature to form a single block. The block can then be machined to the desired shape, and sintered. Where unidirectional tapes or similar carriers are employed, the orientation of the fibers in each layer can be altered, giving a multi-layered product, with continuous pores passing in different directions within the ceramic body.

A preferred example of such an embodiment is one wherein alternating layers are laid at orientations 90° from the adjacent layer, providing an optimum heat-exchange device. The resulting device should be distinguished from that addressed in, e.g., U.S. Pat. No. 3,112,184, which employs, as a carrier, a sheet or film, which provides only a single passageway per layer, resulting in inferior heat-exchange properties.

As noted, the carrier can be virtually any small dimensioned material which is resistant to the mild heating needed to preliminarily cure the resin but is destroyed upon sintering. U.S. Pat. No. 2,875,501 discloses the use of nylon fibers. Such fibers are undesirable, in view of the relatively large dimension that is the minimum that may be achieved in the preparation of such fibers. A preferred fiber is a graphite fiber, which can be provided with micron sized diameters and yet is well known to be compatible with ceramic sintering, disappearing from the ceramic body without ill effects or side reactions. Other suitable carriers would include fibers prepared from similar materials, which are commonly drawable or spinnable to fine dimensions, and include such organic fibers as dacron, silk, cotton, and the like. Certain high temperature resinous materials, which can be drawn to small dimension, can also be employed. Non-organic yarns, such as boron yarns, can also be used. It should be noted that in all cases, the final pore diameter will be less than the corresponding fiber diameter due to shrinkage of the ceramic material during firing. Generally, the shrinkage factor will be from 10-50% dependent upon the initial green density.

Of further note is the fact that reference has been made to carriers which are continuous in nature. This is not intended to distinguish between "continuous" fibers and fibers prepared from spun staple fragments. Rather, it is necessary, for the practice of the invention, to have a carrier which is continuous in length, such that a continuous passage is provided in the final ceramic body.

EXAMPLE

To prepare a ceramic body of controlled porosity, a unidirectional tape (36 tows) of graphite fiber (filament diameter approximately 7 microns) was drawn through a slurry containing 75 percent by volume acrylate resin and 25 percent $Al_2O_3$ powder (0.5 micron). The tows were impregnated and the acrylate resin was cured by mild heating, up to about 350° F. The resulting sheets were stacked and fired in an oxygen containing atmosphere at 1400° C., for a period of about 2 hours. The graphite fibers burned off, leaving holes (passages) smaller than the diameter of the original fibers due to shrinkage of the ceramic during sintering. In this example, the resultant holes were 3.5 microns in diameter, 50% of the original.

Alternatively, multiple layers can be provided, in aligned fashion, and sintered to provide a catalyst support. With such a support it may also be advantageous to use textured or staple yarns or fibers as the support in order to increase the total surface area. For a heat-exchange device, the sheets are layered in alternating 0°-90° orientation. To prepare a ceramic body for filter applications, the layers are placed on a tool having a non-linear topography, and sintered thereon.

In all cases, upon sintering, the prepared device consists solely of the ceramic, with continuous pores provided therethrough.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A process for manufacturing a ceramic body of controlled porosity, comprising:
   (1) impregnating a plurality of fibers which volatilize upon oxidation with a slurry comprised of a liquid polymer with powdered ceramic material dispersed therethrough,
   (2) preliminarily curing said polymer to provide a layer of fiber-reinforced polymer matrix with powdered ceramic material therein,
   (3) repeating steps (1) and (2) to provide a plurality of said layers of fiber-reinforced polymer matrix with powdered ceramic material therein,
   (4) laminating said layers and
   (5) sintering said laminated layers to provide a ceramic body with separate, continuous pores provided therethrough.

2. The process of claim 1 wherein said laminated layers are consolidated, by application of at least one of heat and pressure, and shaped or machined to the final shape, prior to sintering.

3. The process of claim 1, wherein the fibers of any one layer are oriented in the same direction, and the fibers in any layer in the laminate are oriented at an angle other than 0° with respect to the adjacent layers.

4. The process of claim 1, wherein said fibers have an average filament diameter of less than about 15 microns.

5. The process of claim 1, wherein said laminate is formed on a tool having a non-linear topography.

6. The process of claim 1, wherein said liquid polymer is a thermosetting resin and said fiber is comprised of graphite.

7. The process of claim 1, wherein said liquid polymer is a thermoplastic resin.

8. The process of claim 1, wherein said fibers are comprised of oxidizable material selected from the group consisting of graphite, non-graphite carbon, dacron, silk, cotton, boron and mixtures thereof.

9. The process of claim 1, wherein said fiber has an average filament diameter of less than 10 microns.

10. A ceramic body of controlled porosity, comprised of sintered ceramic material, said ceramic body comprising at least two substantially planar layers of separate, continuous pores therethrough, said layers being separated by a layer of ceramic material, the pores of said first layer being in a direction at 90° to the direction of the pores in said second layer.

11. The ceramic body of claim 10, wherein said continuous pores have a non-linear pathway.

12. A ceramic body of controlled porosity of claim 10, comprised of sintered ceramic material, said ceramic body comprising continuous pores therethrough having an average diameter of less than about 10 microns.

* * * * *